United States Patent [19]
Rockwell et al.

[11] Patent Number: 5,434,662
[45] Date of Patent: Jul. 18, 1995

[54] SPECKLE RESISTANT METHOD AND APPARATUS WITH CHIRPED LASER BEAM

[75] Inventors: David A. Rockwell; Metin S. Mangir, both of Santa Monica, Calif.

[73] Assignee: Hughes Aircraft Company, Los Angeles, Calif.

[21] Appl. No.: 173,302

[22] Filed: Dec. 23, 1993

[51] Int. Cl.⁶ ............................................. G01C 3/08
[52] U.S. Cl. ..................................... 356/4.01; 356/28
[58] Field of Search .................... 356/4, 5, 28, 28.5

[56] References Cited

U.S. PATENT DOCUMENTS

| | | | |
|---|---|---|---|
| 3,811,774 | 5/1974 | Honeycutt et al. | 356/5 |
| 4,721,385 | 1/1988 | Jelalian et al. | 356/5 |
| 5,150,170 | 9/1992 | Morris | 356/28.5 |
| 5,275,168 | 1/1994 | Reintjes et al. | 128/665 |

OTHER PUBLICATIONS

Nosach et al., "Cancellation Phase Distortions In An Amplifying Medium With a 'Brillouin Mirror'", *JEPT Letters* 16, 435, 1972, pp. 435–438.
Reintjes et al., "Beam cleanup with stimulated Raman scattering in the intensity–averaging regim", *J. Opt. Soc. Am.*, B/vol. 3, No. 10, Oct. 1986, pp. 1408–1427.
Born and Wolf, *Principles of Optics: Electromagnetic Theory of Propagation, Interference and Diffraction of Light*, 5th ed., Pergamon Press, 1975, pp. 316–323.
Schulz and Henion, "Frequency–modulated Nd:YAG laser", *Optics Letters*, vol. 16, No. 8/Apr. 15, 1991, pp. 578–580.
Yariv, *Introduction to Optical Electronics*, Holt, Rinehart and Winston, Inc., 1971, pp. 236–242.

*Primary Examiner*—Mark Hellner
*Attorney, Agent, or Firm*—V. D. Duraiswamy; Wanda Denson-Low

[57] ABSTRACT

Laser beam speckle effects are mitigated by frequency chirping a single-mode laser beam, reflecting it off a speckling surface, and then integrating the reflected beam over at least one chirp period. The speckle reduction is comparable to the use of a multi-longitudinal mode beam having a bandwidth similar to the chirped frequency excursion, while leaving the beam compatible with nonlinear optical processes that are not compatible with multi-longitudinal mode beams. Where the nonlinear process is stimulated Brillouin scattering (SBS) phase conjugation, the beam can be chirped at a rate up to the order of $$\frac{\Delta \nu_B}{L/C},$$

where $\Delta \nu_B$ is the gain bandwidth and L is the effective SBS interaction length of the phase conjugator, and C is the speed of light. Other nonlinear processes with which the beam may be used include harmonic generation and Raman-based beam cleanup or wavelength conversion.

27 Claims, 1 Drawing Sheet

SPECKLE RESISTANT METHOD AND APPARATUS WITH CHIRPED LASER BEAM

BACKGROUND OF THE INVENTION

1. Field of the Invention

This invention relates to a method and apparatus for reducing speckle effects when a laser beam is reflected from a surface, and more particularly to the use of a chirped speckle-reducing laser beam that is compatible with nonlinear optical processes.

2. Description of the Related Art

When laser light is reflected from an extended three-dimensional object, a sparkling or speckled pattern referred to as laser speckle is typically observed in the reflected light. The speckle pattern results from wave interference. Each point on the surface of the object scatters the illuminating laser light as a spherical wave, so that the overall surface can be approximated as a collection of a great number of closely packed point sources. Because of the three-dimensional (i.e. non-planar) shape of the surface, the relative phases of the point sources depend in a systematic manner on the locations of the point sources. When the reflected beam is focused onto a detector or imaging device, wave contributions from a number of different points on the illuminated surface are present at any given point on the focal plane, each with its distinct phase. The superposition of these waves produces an irregular interference pattern, known as the speckle pattern.

A growing number of advanced electro-optical systems employ some form of active imaging or tracking, such as using a laser to illuminate a distant target that is then imaged and tracked. A common problem with such laser illumination is that the resulting images are often degraded due to speckle effects.

The interference which gives rise to laser speckle is a manifestation of laser coherence. One approach to eliminating or at least reducing speckle effects has been to specify that the laser source have a relatively short coherence length (for example, on the order of 1 cm). This technique of minimizing interference effects by utilizing a short coherence length is described, for example, in Born and Wolf, *Principles of Optics: Electromagnetic Theory of Propagation, Interference and Diffraction of Light*, 5th ed., Pergamon Press, 1975, pages 316-323. In principle, a short coherence length is easily achieved by operating the laser oscillator in many longitudinal modes simultaneously. In practice, however, while such multi-mode operation is indeed effective in reducing speckle effects, it complicates laser source development because it is incompatible with several common nonlinear optical processes, and can preclude the use or reduce the effectiveness of such processes. Examples of such nonlinear optical processes are stimulated Brillouin scattering (SBS) phase conjugation used for beam cleanup, harmonic generation for wavelength conversion, and Raman applications for beam combining or wavelength conversion. There is a basic incompatibility between the long coherence length that is necessary for effective SBS phase conjugation or other nonlinear optical processes, and the short coherence length used for speckle reduction.

Another approach to eliminating speckle effects is to employ stimulated rotational Raman scattering (SRRS) to generate multiple wavelengths from a single initial wavelength. This technique is described in U.S. patent application Ser. No. 08/004,166, "Speckle Suppression Illuminator" filed Jan. 11, 1993 by Rafanelli et al. and assigned to Hughes Aircraft Company, the assignee of the present invention. In this approach the initial laser beam can possess a high degree of coherence. However, there are several disadvantages, including a relatively high degree of complexity, less than optimum output beam quality, optical design problems arising from chromatic effects, limited power scalability and relatively ineffective speckle reduction.

In the Rafanelli et al. application the output of the prime laser, which is assumed to be a frequency-doubled Nd laser producing a wavelength of about 530 nm, is directed into a low-pressure hydrogen gas cell in which multiple-order rotational Raman shifts are imparted to the beam by stimulated rotational Raman scattering (SRRS). Each shift produces a new wavelength that is separated from the lower Stokes order by about 10-20 nm. Present indications are that 8-10 lines might be produced, with a total energy amounting to about 80% of the initial input energy.

In addition to considerable complexity, SRRS converters typically produce an increasingly poor beam quality in the higher Stokes orders; this reduces the effectiveness of the speckle reduction technique in most anticipated applications, which generally require a high beam quality. There are also serious challenges in designing optics and coatings that can accommodate the multiple SRRS beams (which typically span a total wavelength range in excess of 100 nm), because of chromatic effects in coatings and optical materials. It has furthermore been shown that speckle reduction with the SRRS approach scales roughly as the square root of the number of Stokes orders; this weak dependence arises from the wide wavelength separation of the Stokes lines.

SUMMARY OF THE INVENTION

The present invention seeks to provide a speckle resistant method and apparatus for producing a laser beam, for applications such as monitoring an object with a speckling surface, that significantly reduces speckling effects and yet is compatible with nonlinear optical processes. Other goals are the provision of a speckle reduction method and apparatus that are less complex than the SRRS approach, are capable of producing a diffraction-limited beam with high efficiency, works with a narrow spectral distribution that can be easily handled using simple optics and coatings, is power scalable, and produces a continuous time-integrated spectral distribution over a frequency range of the order of 10 GHz or even higher to provide a more effective speckle reduction.

To accomplish this goal, a laser is operated in a single longitudinal mode, with its frequency chirped either linearly or non-linearly to produce repeated frequency excursion pulses. After reflection off a speckling surface, the beam is integrated over at least one chirp period to mitigate speckling effects.

The speckle reduction is comparable to that achieved with the prior multi-mode approach with a similar frequency range. However, the new technique is compatible with, and does not degrade, the use of nonlinear optical processes for the beam. For example, when used with an SBS phase conjugation process, which has a lower chirp tolerance than either stimulated Raman scattering (SRS) or harmonic generation, the maximum chirp rate is on the order of $$\frac{\Delta \nu_B}{L/C},$$

where $\Delta \nu_B$ is the gain bandwidth of the SBS process and L is the effective SBS interaction length, with C being the speed of light. The technology is presently available for producing such chirp rates up to the maximum tolerable rate of about 10 GHz/μsec, thus allowing for a high degree of speckle reduction.

These and further features and advantages of the invention will be apparent to those skilled in the art from the following detailed description, taken together with the accompanying drawings.

DETAILED DESCRIPTION OF THE INVENTION

The present invention is based upon a recognition that a single-frequency (single longitudinal mode) laser with its frequency swept over a spectral range of $\Delta \nu$, within a time no greater than the frame period over which the laser beam is imaged, will produce essentially the same speckles in the image as would be produced by a multiple-frequency laser with a total spectral bandwidth of $\Delta \nu$. In the multiple-frequency case, the speckles are reduced relative to those of a fixed, single-frequency laser due to a linear superposition of speckle interferograms from each of the multiple simultaneous laser frequencies. With a chirped laser beam, in which the frequency is swept over the same bandwidth $\Delta \nu$ but only a single frequency is present at any instant of time, a similar superposition can be achieved by integrating the speckle interferograms over the entire chirp period.

Figure 1:
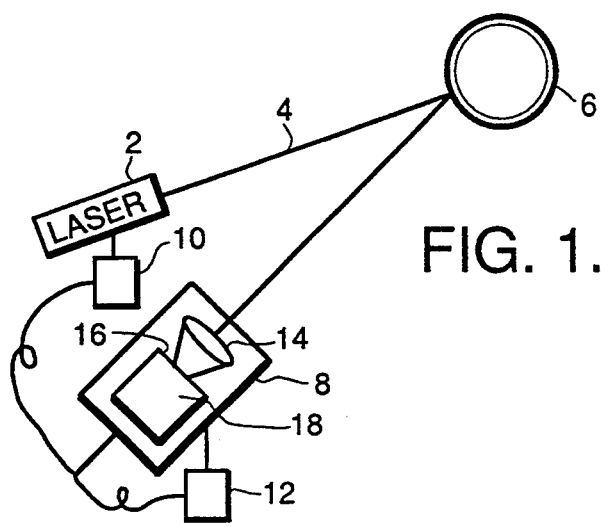
FIG. 1 is a block diagram illustrating a laser tracking system to which the present invention is applicable.

A typical application for the invention is illustrated in FIG. 1. A laser 2 directs a laser beam 4 towards a distant target, such as a satellite 6, from which the beam is reflected to a receiver 8. The receiver tracks the target, and controls laser and receiver tracking mechanisms 10 and 12 which keep the laser and receiver pointed towards the target. The laser beam is repeatedly chirped between minimum and maximum frequencies.

As described thus far, FIG. 1 is similar to a conventional chirped laser radar. A crucial difference, however, is that the heterodyne detection employed by laser radar beats the received signal after reflection from the target against the locally generated laser signal, and requires a knowledge of the instantaneous frequency of the locally generated signal. By contrast, in the present invention the received signal is integrated over at least a full chirp period, which destroys the instantaneous frequency information required by chirped laser radar systems.

In the illustrative application shown the receiver 8 is implemented as a vidicon, with a lens 14 that images the received beam onto a focal plane 16 which feeds an image processor 18; a CCD (charge coupled device) camera could also be used. The current standard vidicon frame rate for video is 30 frames per second, yielding individual frame periods of about 0.03 second. Frame rates achieved with state of the art vidicons are about an order of magnitude faster, with proportionately shorter frame periods. As described below, typical applications for the invention involve chirp periods that are significantly shorter than even the reduced frame periods with state of the art vidicons; multiple frequency chirps are accordingly integrated over each frame period.

Figure 2:
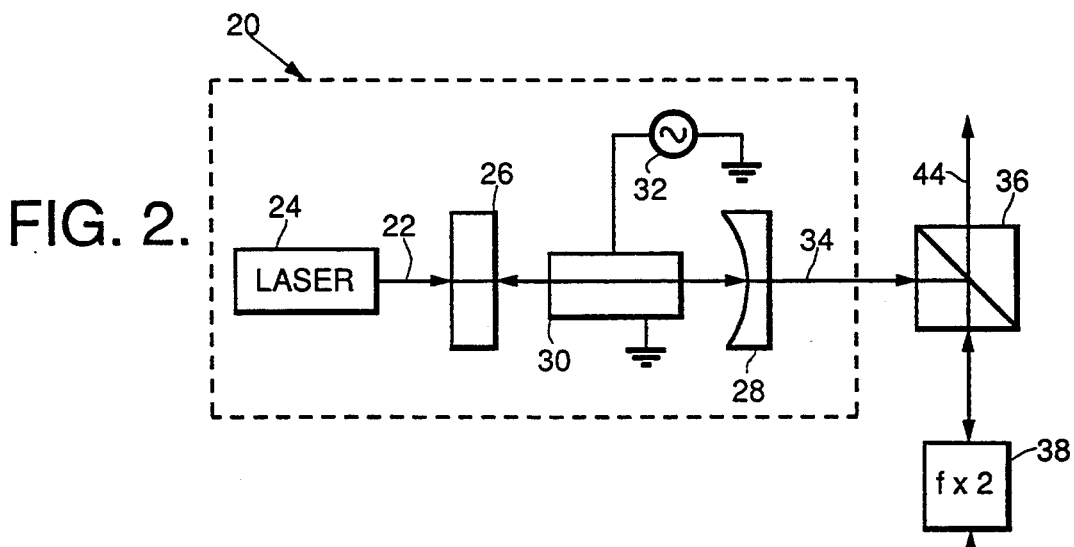
FIG. 2 is a block diagram illustrating the application of the invention to an SBS PCM and harmonic generation system.

FIG. 2 is a block diagram of a system that can be used to generate a high power chirped laser beam. It employs a relatively low power Nd:YAG (neodymium:yttrium-aluminum-garnet) laser, shown enclosed in dashed line 20. A pump beam 22 is provided by a Ti:Al$_2$O$_3$ or diode laser 24 that is tuned to 808.7 nm, the peak of the Nd:YAG absorption band. The beam passes through a dichroic coating on an Nd:YAG crystal 26, which has 80% transmission at 809 nm and 99% reflection at 1.06 μm. The laser cavity is formed by this coating at one end, and a 5%-transmission output coupling mirror 28 at the other end. An LiTaO$_3$ electro-optic phase modulator crystal 30 is positioned between the Nd:YAG crystal 26 and the output mirror 28, and swept with a transverse electric field by a pulsed voltage source 32 that operates at the desired chirp rate. The electric field across the LiTaO$_3$ crystal 30 produces a linear voltage-to-frequency conversion in which the frequency of the laser's output beam 34 follows the applied voltage. This type of system is described in Schulz and Henion, "Frequency-modulated Nd:YAG laser" *Optics Letters*, Vol. 16, No. 8, Apr. 15, 1991, pages 578–580; the electro-optic frequency modulation of laser beams is described in general in Yariv, *Introduction to Optical Electronics*, Holt, Rinehart and Winston, Inc., 1971, pages 236–242. Other systems might also be envisioned for generating a chirped laser beam, such as producing a single-frequency beam and then separately modulating its frequency.

The laser output beam 34 is relatively low power. To amplify the beam and also change its frequency as desired, the beam is deflected by a beam splitter 36 into a conventional nonlinear optical frequency doubler 38, which can perform a wavelength conversion through the generation of harmonics of the input beam frequency; in this example the wavelength converter is illustrated as a frequency doubler. The nonlinear optical process employed in harmonic generation is described in Yariv, supra, pages 189–194.

The laser beam is then directed through an optical amplifier 40, which can be implemented as multiple amplification stages with optical isolation (as required) between successive stages. After amplification, the beam is processed by a nonlinear optical phase-conjugate mirror (PCM) 42, such as the SBS PCM described in Nosach et al., "Cancellation of Phase Distortions In An Amplifying Medium With A 'Brillouin Mirror'", *JETP Letters*, 16, 435, 1972, pages 435–438. The PCM cleans up aberrations that are imposed upon the beam by the amplifiers and the frequency doubler. The PCM is characterized by an effective SBS interaction length L over which the beam undergoes conjugation, to emerge as a retro-reflected beam that is transmitted back through the amplifier 40 and harmonic generator 38. While the beam power will generally not be great enough to actuate the harmonic generator 38 on its first pass, on its return pass the beam is powerful enough to achieve efficient frequency doubling. The amplified frequency-doubled beam is then transmitted out of the system by beam splitter 36, emerging as a final output beam 44 that can be pointed towards a distant target.

The system of FIG. 2 involves two nonlinear processes: the harmonic generator 38 and the PCM 42. If the laser beam were multi-mode these nonlinear processes could not have been used, or at a minimum their effectiveness would be substantially reduced. By chirping the single-mode laser beam, which involves operating the laser 20 with a short effective time-averaged coherence length, a speckle reduction comparable to that achieved with multi-mode operation is achieved. However, in contrast to operating the laser oscillator in many longitudinal modes, the output beam produced with the invention is compatible with nonlinear optical processes.

In FIG. 2 the nonlinear processes are integrated into the overall generation of a chirped laser beam powerful enough to illuminate a remote target. The invention also makes possible a significant speckle reduction when the nonlinear optical process is performed after the beam has been reflected from the target. For example, a nonlinear optical amplifier that is located at the receiver to amplify the reflected signal would be compatible with the chirped beam.

Figure 3:
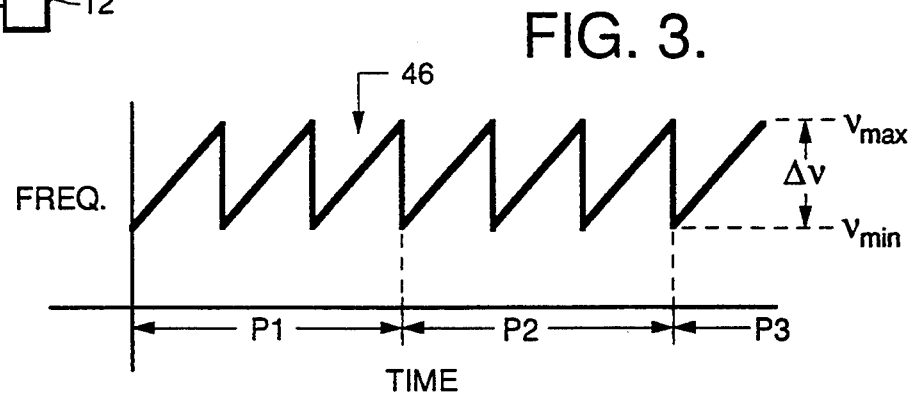
FIG. 3 is a graph showing illustrative laser chirping and integration periods.

One example of laser frequency chirping is illustrated in FIG. 3, which is not to scale. Although FIG. 3 illustrates a linear chirping, the change in frequency over time for each chirp could also be non-linear; sinusoidal and step frequency variations are examples of non-linear chirping.

With a frequency modulated laser such as that described in the Schulz and Henion article mentioned above, linear voltage-to-frequency conversions can be achieved, with a frequency excursion $\Delta \nu$ up to 1.2 GHz generated with a rise time of 0.6 ns. With this type of beam, a frequency-time plot 46 follows a generally sawtooth pattern. The minimum frequency $\nu_{min}$ at the beginning of each chirp period would correspond to a 530 nm wavelength for a frequency doubled Nd:YAG laser. P1, P2 . . . illustrate the vidicon frame periods over which the received laser signal is integrated. Although only three chirp periods are shown included in each vidicon period, in practice there would normally be considerably more.

For each nonlinear process with which the invention may be used, there is a maximum chirp rate. The chirp tolerance of an SRS process is greater than for nonlinear optical phase conjugation (NOPC), and second harmonic generation is compatible with even higher chirp rates. Accordingly, the maximum tolerable chirp rate for NOPC is discussed below as the limiting case.

In understanding how to utilize the present invention with nonlinear optical phase conjugation, one must recognize that the selection of any particular type of phase-conjugate mirror imposes a specific tolerance on the degree to which the frequency of the signal beam (i.e. the beam to be conjugated) can be changed. This tolerance generally has two elements, one that limits the total frequency deviation that can be tolerated, and one that limits the rate at which the frequency can be chirped. Both of these tolerance elements depend on the specific nonlinear optical process being utilized.

The limit to the total frequency deviation is established by the frequency bandwidth of the nonlinear optical process. For example, a PCM based on saturable absorption in sodium vapor tolerates frequency deviations of only a few GHz from the center of the absorption line, while a PCM based on SBS can be utilized over a broad frequency range extending from the ultraviolet to the near infrared. This invention can only be applied when this allowed frequency deviation is sufficiently broad (typically ~10 GHz) to achieve the desired speckle reduction.

The limit to the chirp rate is established by such factors as the response time and the spatial period of the refractive-index grating established by the nonlinear interaction. Although this limit can be easily quantified for any nonlinear process that might be contemplated, we consider below only the specific case of phase conjugation via SBS.

A rule of thumb for an SBS PCM is that good performance (good conjugation fidelity and reasonable efficiency) can be achieved only if the laser coherence length is at least as long as the effective SBS interaction length. A single-cell SBS PCM for a laser having an output-energy specification of about 1 joule at 1 micron has an effective interaction length of typically about 1-2 cm, allowing the PCM to perform satisfactorily with a laser pulse having a coherence length of only about 1-2 cm. Higher energy applications, however, can require a dual-cell PCM that involves an effective interaction length on the order of 100 cm. The use of a broadband laser, which has a shorter coherence length, is incompatible with such a PCM.

In an SBS PCM the Stokes wave is created by scattering the input wave off an acoustic wave. Accordingly, the frequency of the Stokes wave will track changes in the frequency of the input laser beam following a delay time of approximately L/C, where L is the effective SBS interaction length and C is the speed of light. If the SBS gain bandwidth is $\Delta \nu_B$, the maximum permissible chirp rate is on the order of $$\frac{\Delta \nu_B}{L/C}.$$

For a typical dual-cell high energy SBS PCM, L is approximately 100 cm, the delay time is approximately 3 nsec, and $\Delta \nu_B$ is approximately 30 MHz. A maximum allowable chirp rate is therefore about 30 MHz in about 3 nsec, or 10 GHz/$\mu$sec. As described in the Schulz and Henion article, maximum frequency excursions of 1.2 GHz in 0.6 ns have been achieved; this corresponds to a chirp rate of 2,000 GHz/$\mu$sec. Chirp rates on the order of 10 GHz/$\mu$sec are thus currently achievable.

For lower energy systems requiring a coherence length of only about 2 cm, the spectral bandwidth is about $\frac{1}{2}$ cm$^{-1}$, or 15 GHz. Assuming a laser chirp rate of about 3 GHz/$\mu$sec, this spectral bandwidth can be achieved with a 5 $\mu$sec pulse duration.

Figure 4:
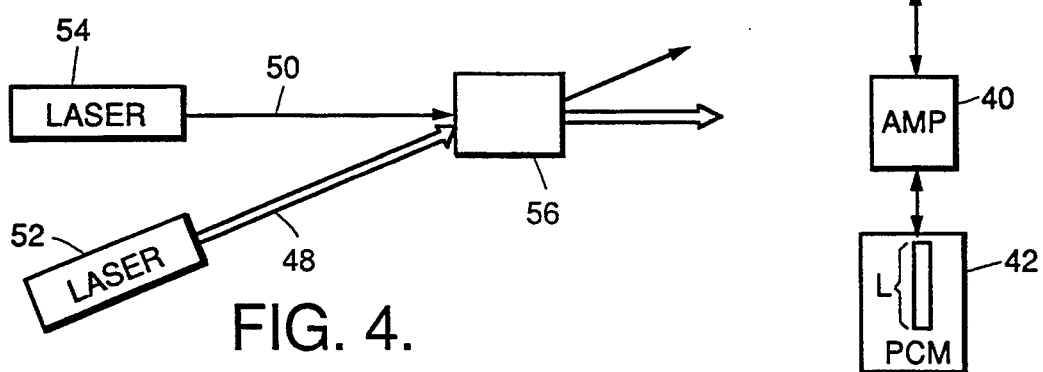
FIG. 4 is a block diagram illustrating the application of the invention to a Raman-based beam manipulation system.

In addition to the PCM and harmonic generation processes employed in the system of FIG. 2, the invention is applicable to other nonlinear processes such as stimulated Raman scattering (SRS). Such an application is illustrated in FIG. 4, in which high and low power laser beams 48 and 50 from lasers 52 and 54, respectively, are directed into a medium 56 in which an energy transfer occurs between the beams through SRS. As a result, beam 48 emerges with a diminished power level and beam 50 emerges amplified. The use of SRS in general for frequency conversion and/or laser beam clean-up is described in Reintjes et al., "Beam clean-up with stimulated Raman scattering in the intensity-averaging regime, *J. Opt. Soc. Am.*, B/Vol. 3, No. 10, Oct. 1986, pages 1408-1427. The amplified beam can undergo repeated frequency excursions as required by the invention so as to mitigate speckle effects, while remaining suitable for the Raman process.

The invention thus makes it possible to eliminate or greatly reduce speckle effects that generally arise in laser illumination applications, while at the same time allowing the use of many desired nonlinear optical processes. While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A method of monitoring an object that has speckling surface, comprising:
   producing a repeatedly frequency-chirped laser beam having a predetermined chirp period, wherein said laser beam is produced with a nonlinear optical process,
   reflecting said laser beam off said speckling surface, and
   integrating the reflected beam over at least one chirp period to mitigate speckle effects.

2. The method of claim 1, wherein said laser beam is produced with said nonlinear optical process before it is reflected off said speckling surface.

3. The method of claim 2, wherein said nonlinear optical process comprises phase conjugation.

4. The method of claim 3, wherein said phase conjugation comprises stimulated Brillouin scattering (SBS) phase conjugation.

5. The method of claim 4, said SBS process having a predetermined gain bandwidth $\Delta v_B$ and an effective interaction length L, wherein said laser beam is chirped at a rate not greater than $$\frac{\Delta v_B}{L/C},$$

where C is the speed of light.

6. The method of claim 5, wherein said laser beam is chirped at a rate on the order of $$\frac{\Delta v_B}{L/C}.$$

7. The method of claim 2, wherein said nonlinear process comprises harmonic generation.

8. The method of claim 2, wherein said nonlinear process comprises Raman-based beam cleanup or wavelength conversion.

9. The method of claim 1, wherein said frequency chirping is non-linear with respect to time.

10. The method of claim 1, wherein said reflected beam is integrated with a detector or imaging device having frame periods longer than the beam chirp periods.

11. The method of claim 10, wherein said object is moving and said laser beam is controlled to track said object.

12. A speckle resistant laser beam processing method, comprising:
   generating a laser beam with a single longitudinal mode,
   subjecting said laser beam to frequency excursions while preserving its single mode character, and
   processing said frequency excursion beam with a nonlinear optical process that is at least partially incompatible with multi-longitudinal mode laser beams,
   wherein said laser beam is reflected from an object being monitored and is imaged and integrated over at least one frequency excursion period after processing with said nonlinear process.

13. The method of claim 12, where said nonlinear optical process comprises phase conjugation.

14. The method of claim 13, wherein said phase conjugation process comprises stimulated Brillouin scattering (SBS) phase conjugation.

15. The method of claim 14, said SBS process having a predetermined gain bandwidth $\Delta v_B$ and an effective interaction length L, wherein said laser beam is subjected to said frequency excursions by chirping its frequency at a rate not greater than $$\frac{\Delta v_B}{L/C},$$

when C is the speed of light.

16. The method of claim 15, wherein said laser beam is chirped at a rate on the order of $$\frac{\Delta v_B}{L/C}.$$

17. The method of claim 12, wherein said frequency excursions are non-linear with respect to time.

18. The method of claim 12, wherein said frequency excursions are periodic.

19. A speckle resistant laser system, comprising:
   a laser beam source for producing a laser beam with a chirped single longitudinal mode frequency,
   a beam processor disposed to process said beam with a nonlinear optical process that is at least partially incompatible with multi-longitudinal mode laser beams, and
   a beam integrator disposed to integrate said beam over at least one chirp period after it has been processed with said beam processor.

20. The system of claim 19, said beam integrator comprising a detector or imaging device having frame periods longer than the beam's chirp periods.

21. The system of claim 20, said laser source including a tracking capability for pointing the beam at a moving object, with said detector positioned to receive said beam after it has been reflected off said object.

22. The system of claim 19, wherein said beam processor performs a phase conjugation process upon said beam.

23. The system of claim 22, wherein said beam processor comprises a stimulated Brillouin scattering (SBS) phase conjugate mirror.

24. The system of claim 23, said beam processor having a predetermined gain bandwidth $\Delta v_B$ and an effective interaction length L, wherein said laser source chirps said beam at a rate not greater than $$\frac{\Delta \nu_B}{L/C},$$

where C is the speed of light.

25. The system of claim 24, wherein said laser source chirps said beam at a rate on the order of $$\frac{\Delta \nu_B}{L/C}.$$

26. The system of claim 19, wherein said laser beam source produces said laser beam with a non-linearly chirped single longitudinal mode frequency.

27. The system of claim 19, wherein said nonlinear process comprises harmonic generation, Raman-based beam cleanup or wavelength conversion.

* * * * *